United States Patent [19]

Stella et al.

[11] 3,976,869

[45] Aug. 24, 1976

[54] SOLID STATE RESOLVER COORDINATE CONVERTER UNIT

[75] Inventors: Carl Stella, Stockholm; Edward Costello, Paterson, both of N.J.

[73] Assignee: The Singer Company, Little Falls, N.J.

[22] Filed: Sept. 27, 1974

[21] Appl. No.: 509,776

[52] U.S. Cl. ............................. 235/189; 235/156; 235/186; 340/347 SY
[51] Int. Cl.² .......................................... G06F 7/38
[58] Field of Search ........... 235/186, 189, 152, 156, 235/150, 53; 340/347 AD, 347 SY

[56] References Cited

UNITED STATES PATENTS

| | | | |
|---|---|---|---|
| 3,578,959 | 5/1971 | Perkins | 235/152 |
| 3,684,876 | 8/1972 | Sutherland | 235/152 |
| 3,746,849 | 7/1973 | Bailey | 235/156 |
| 3,767,905 | 10/1973 | Garde | 235/156 |
| 3,868,680 | 2/1975 | Rhodes | 235/186 X |

Primary Examiner—Joseph F. Ruggiero
Attorney, Agent, or Firm—T. W. Kennedy

[57] ABSTRACT

A computing system for performing digital sequential coordinate transformations on n dimensional vector input data referenced to a sensor system and ultimate outputting of the n dimensional vector data having basis in an alternate reference system in a form compatible with utilization equipment. The system adopts the basic "Cordic Algorithm" but eliminates the need for interim storage elements by the provision in a digital computing resolver of n registers, one for each of the n orthogonal axes plus a register for the rotation angle wherein the orthogonal registers are selected sequentially by the program in pairs to develop the terminal vector solutions. Additionally, the system provides a means of cross-addition between registers which reduces register capacity and eliminates the need for circuitry to perform trigonometric subroutines.

17 Claims, 15 Drawing Figures

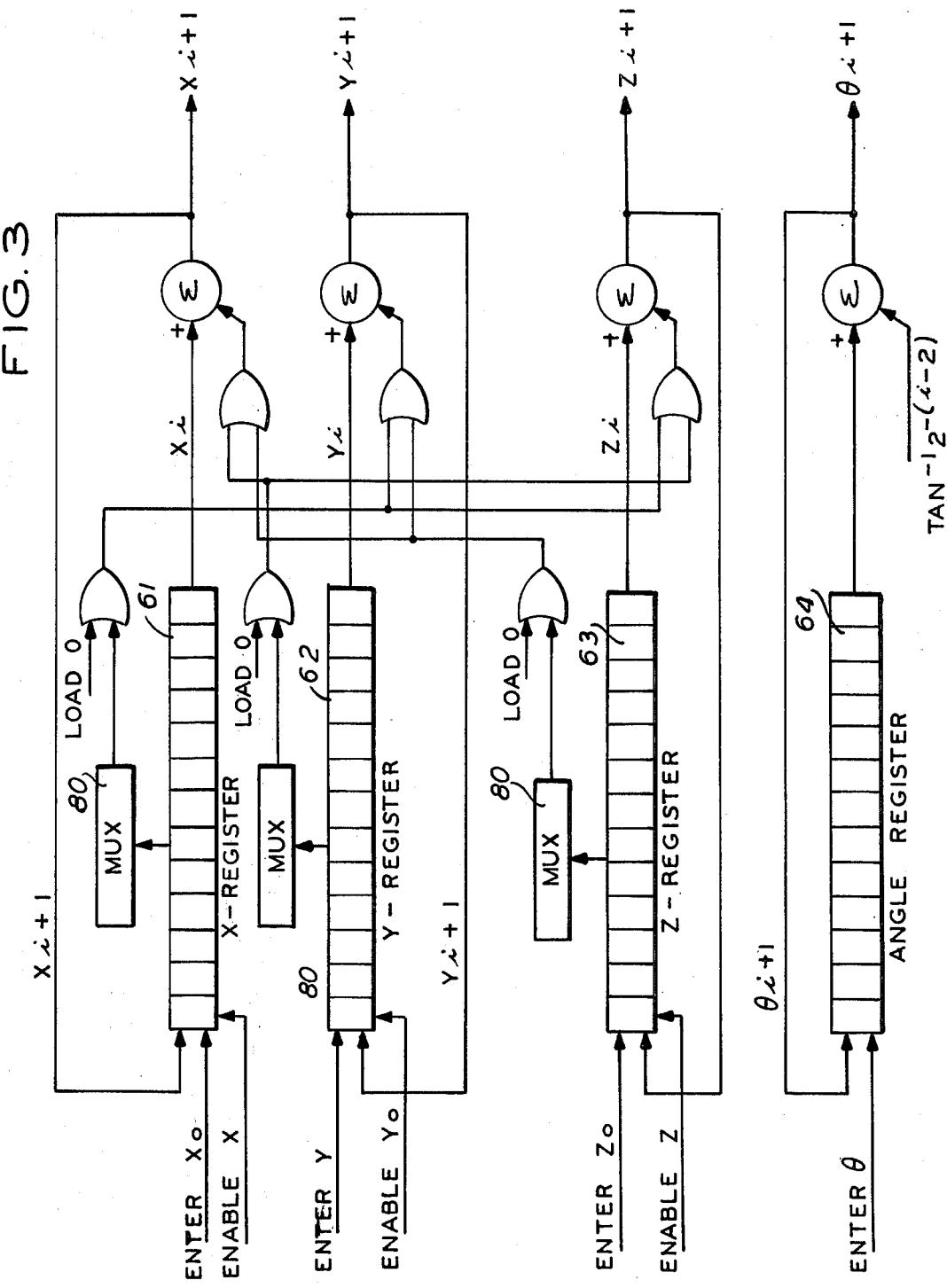

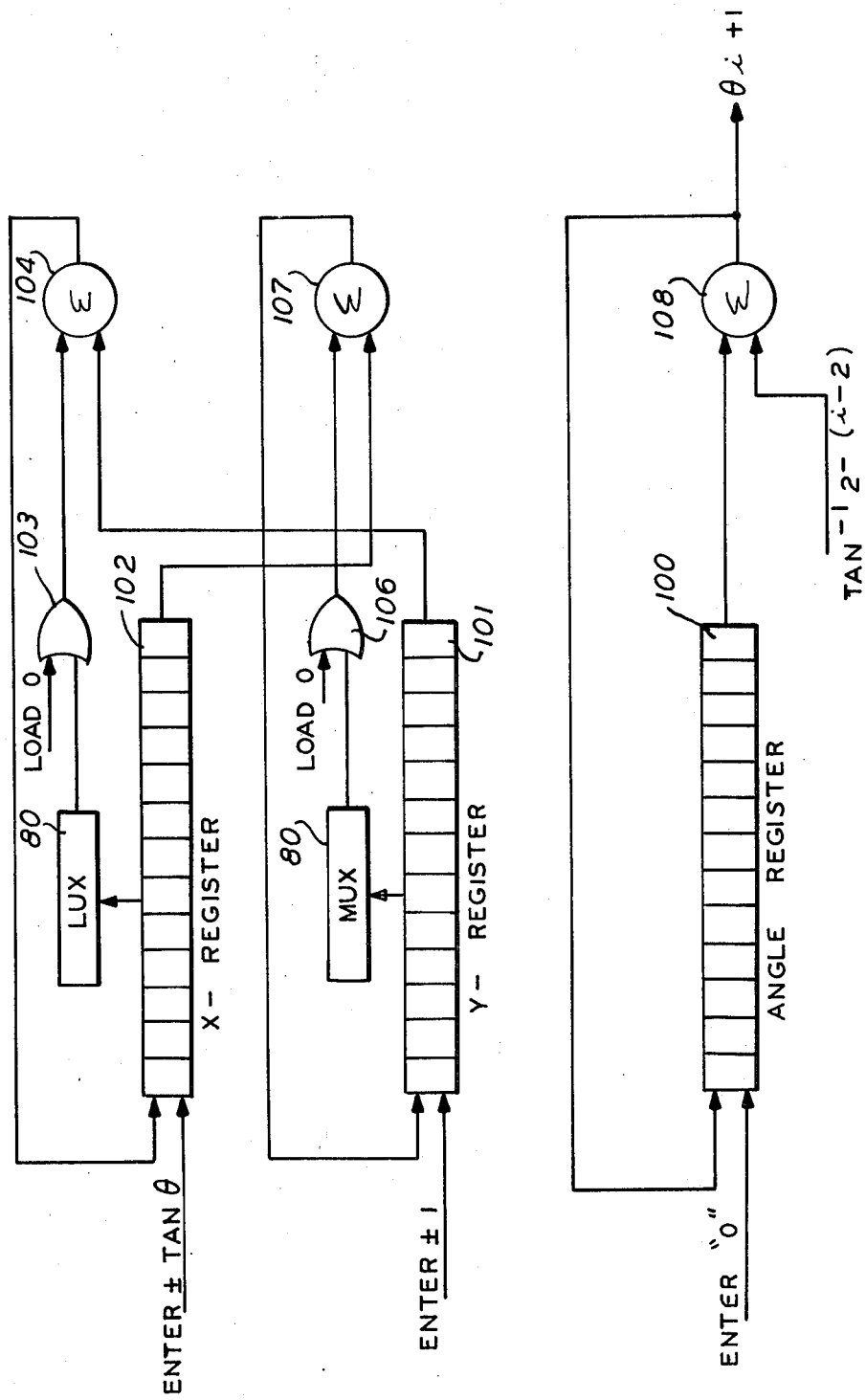

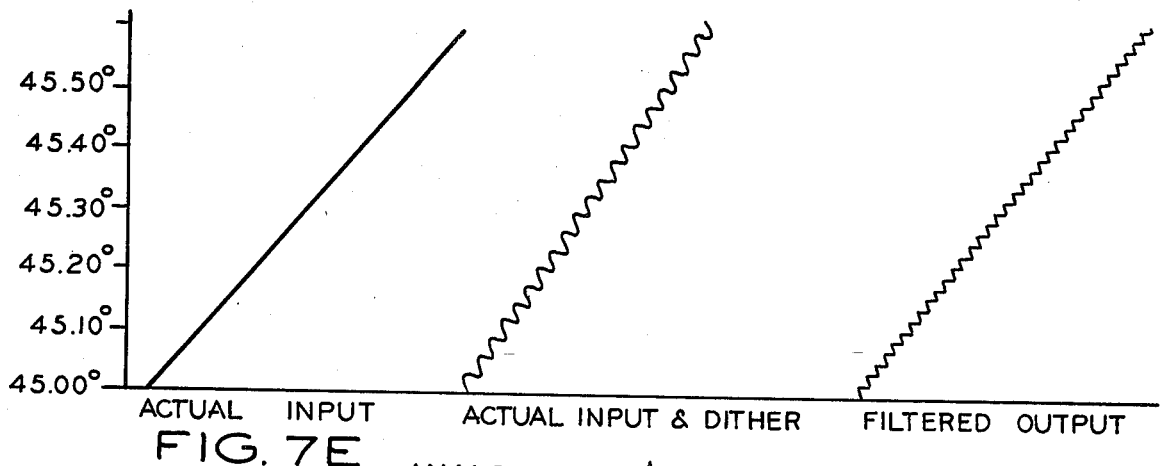
FIG. 7E
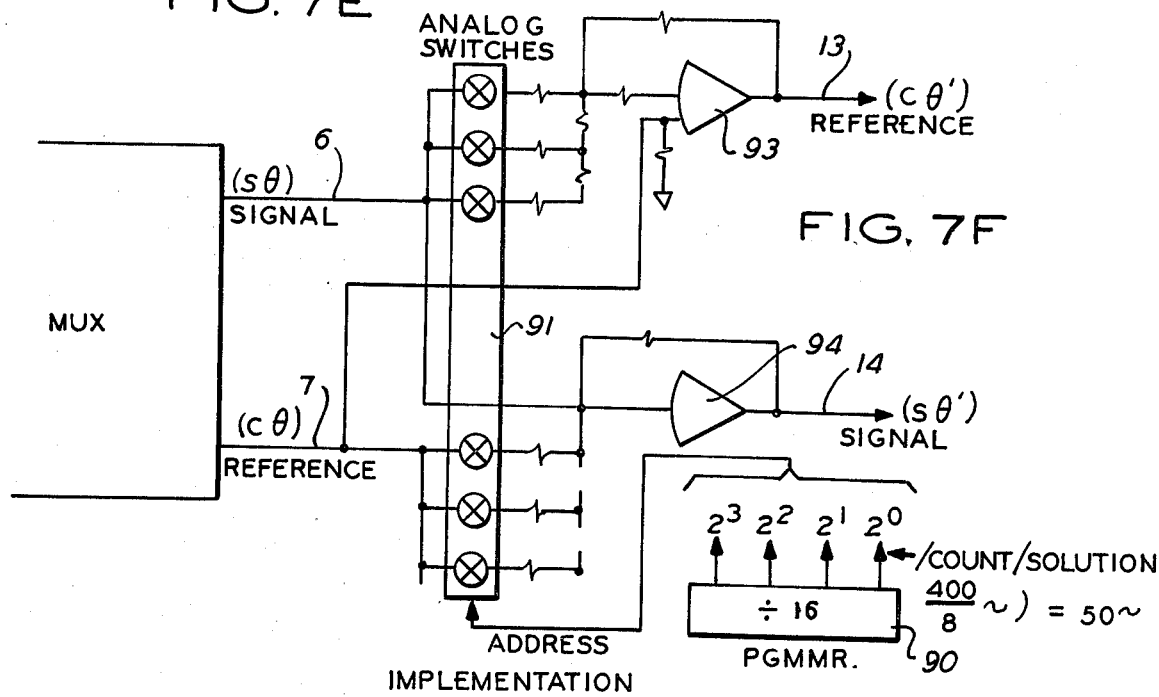
FIG. 7F
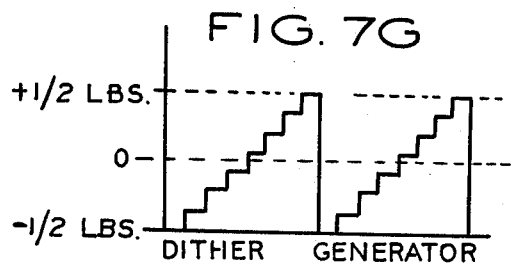
FIG. 7G
FIG. 7I
$$s\theta' = s\theta \, c\Delta\theta + c\theta \, s\Delta\theta$$
$$c\theta' = c\theta \, c\Delta\theta - s\theta \, s\Delta\theta$$
$$\Delta\theta = 0°$$
$$\begin{bmatrix} s\theta' = s\theta + c\theta \, s\Delta\theta \\ c\theta = c\theta - s\theta \, s\Delta\theta \end{bmatrix}$$
MATHEMATICS
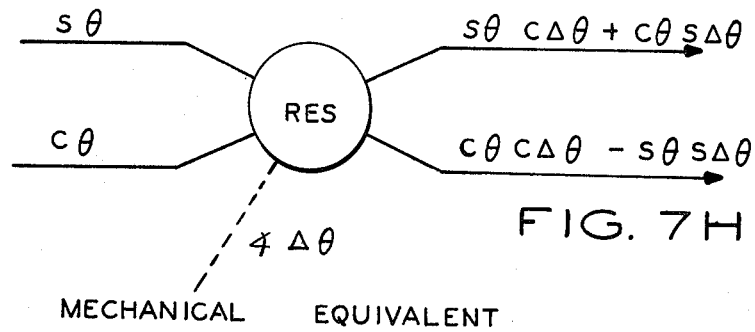
FIG. 7H
MECHANICAL EQUIVALENT

SOLID STATE RESOLVER COORDINATE CONVERTER UNIT

This invention relates to a modular solid state computing system for performing sequential coordinate transformations on $n$ dimensional derived pointing vectors and ultimate outputting of digital or $n$ dimensional analog pointing vectors for use in digital or analog equipments.

BACKGROUND OF THE INVENTION

In the fields of space technology and navigation guidance systems, it becomes necessary to process data from synchro and resolver sources with considerable speed and precision. The outputs from these synchros or resolvers may comprise $n$ dimensional analog derived pointing vectors through angles derived from the shaft rotation of the resolvers or synchros.

The most common method of solution employs a servo-mechanism to position a computing resolver to be dictated by the external synchro source. One resolver, and often as many servos, are required for each coordinate transformation (i.e., to compute in the form $X' = X \cos \theta + Y \sin \theta$ and $Y' = Y \cos \theta - X \sin \theta$). The resolvers are electrically interconnected to provide the desired transformations and the total number of rotations of vector pairs to go from the initial system to the final system. Another solution involves digital computers in conjunction with analog-to-digital and digital-to-analog input/output terminal devices which are used where large amounts of digital storage is available or where costs permit. The computing methods for these digital devices commonly utilize conventional trigonometric subroutines requiring relatively large digital storage, noting that the digital storage requirements are proportional to the number of transformations. A third solution to the problem is the implementation of various solid state techniques. However, the past solid state techniques have been characterized by slow solution time and/or accuracy of solution which has been relatively poor.

The disadvantages attendant upon the above-mentioned solutions are substantial. The conventional servoed computing resolver chains have the disadvantage in that their moving parts are subject to wear and breakdown and thereby compromise reliability. They also require relatively short periods between preventive maintenance procedures and are bulky and heavy. Moreover, they have limited accuracy, comsume large amounts of power and are not easily adaptable to new applications. Conventional digital computers have the disadvantage in that digital computation requires high resolution to minimize truncation errors, large memory allocation, and are relatively slow as well as being prohibitive in cost.

The present invention overcomes the aforementioned disadvantages of the prior art. It provides high reliability through the use of solid state modules. It also has the advantages of easy maintenance and no requirement for calibration and alignment. Additional advantages are reduced weight, volume and power. Other advantages are low cost, timesharing capability and a minimum number of instruction and routines. Further, there is no need for extensive computing architecture because arithmetic means is exclusively iterative steps of shift and add.

BRIEF DESCRIPTION OF THE INVENTION

The present invention provides a coordinate converter arranged in a system comprising six solid state modules. The modules are an analog multiplexer, an analog to digital converter, a tangent to angle converter, a digital computing resolver, a digital to analog converter and a programmer. The analog input and output modules would not be required where the application of the invention is employed in digital to digital utilization equipment. The computing technique employed by this invention makes use of the "Cordic Algorithm" discussed by Jack E. Volder on pages 330–334 in the September, 1959 IRE, Transactions on Electronic Computers issue, entitled "The Cordic Trigonometric Computing Technique." This article describes computation in a special purpose digital computer for real-time airborne computation of great circle distance and bearing to distination which requires solutions of the form $X' = X \cos \theta \pm Y \sin \theta$ and $Y' = Y \cos \theta \mp \sin \theta$. In the present invention, the basic algorithm discussed by Volder is utilized. However, the present invention does not require interim storage elements (i.e., memory) as required by the Volder article. Furthermore, digital logic has been incorporated to facilitate cross-addition to reduce the number of solution bits, by approximately one half, without compromise of performance. The necessity of the digital division subroutine to negate the inherent growth factor of "Cordic" is accomodated by analog means (when the application permits) to reduce complexity. In essence the present invention implements Cordic Algorithm with relatively inexpensive active circuitry.

The analog multiplexer simultaneously samples the synchros and voltage analogs of the pointing vector analog into two active signal lines controlled in sequence by the program address. The outputs from the multiplexer correspond to the selected synchro input in the form of D.C. voltages representative of sine and cosine of the addressed synchro angle. Also supplied as an output from the multiplexer are D.C. voltages proportional to pointing vectors in combination with a D.C. reference voltage. The output signals from the multiplexer are fed to the analog to digital converter module where they are encoded into thirteen bit binary data (word length is a function of resolution objectives) for subsequent digital computation of the form $X' = X \cos \theta \pm Y \sin \theta$ and $Y' + Y \cos \theta \mp X \sin \theta$ in the digital computing resolver module. The analog to digital module also provides tangent of the rotation angles for computation in the tangent to angle converter module which in turn supplies binary angle magnitude to the digital resolver module on a timely basis under control of the programmer. The digital computing resolver comprises three vector shift registers plus an additional register for angle $\theta$. The three vector registers are each dedicated to the computation of the three orthogonal vector projections in a desired reference system as determined by the iterated rotation angles inputted to the fourth register. The programmer selects and steers digital initial conditions (i.e., initial vector magnitudes) to the digital computing resolver and selects two of the three vector registers for cross-addition to produce each interim coordinate transformation dictated by the selected rotation angle. The program allows for sequential coordinate transformation operation on two vectors as selected by the program and holding the third vector constant, iterating in the manner required to arrive at the ultimate solution. The outputs from the digital resolver converter ultimately represent the X, Y, and Z solution vectors and are converted under control of the programmer from digital to analog form and stored in the storage module for outputting to utilization devices.

Accordingly, it is an object of this invention to provide a computing apparatus wherein three registers, one for each of three orthogonal axes, are selected sequentially in pairs to develop terminal vector solution without memory storage.

It is a further object of this invention to provide a computing apparatus wherein cross additions through multiplexer and logic circuits substantially reduces required register capacity and minimizes solution time.

It is another object of this invention to provide a computing apparatus wherein compensation in analog circuitry and selected vector rotation through zero degrees maintains constant growth factor in each register thus, eliminating subroutines and circuitry and obviating the necessity to perform digital division.

It is yet another object of this invention to provide a computing apparatus wherein automatic gain control and dither generator enhances resolution to a level, producing outputs which appear to be continuous.

These and further objects of the present invention will become more fully understood by reference to the description which follows and the accompanying drawing wherein:

FIG. 3, is a schematic diagram showing the gating of orthogonal and angle registers in the digital computing resolver;

FIG. 4, is a schematic diagram showing the gating of tangent angle in the tangent to angle converter;

FIGS. 7A through 7I show the dither generator and the implementation and mathematics for the dither insertion.

The process of transforming a vector defined in one reference system to another is dependent upon the angular displacements relating the two systems. Thus, for three dimensional space three angles define the transformation routine. An objective of this invention is to provide an acceptable solid state means of computing vector projections in a desired reference system from analog or digital sensor data defining the vector component magnitudes in the sensor reference systems and the angular displacements relating the two systems.

Transformation of vector values in the solution system is accomplished by projecting vector pairs from their original orthogonal axis to the final orthogonal axis, which are contained in the same plane and displaced by the rotational angle about the third axis. Three rotations in a prescribed order are required to complete the transformation. The solution will always be of the form $X' = X \cos \theta \pm \sin \theta$ and $Y' = Y \cos \theta \mp \sin \theta$, where X and Y are the original vectors, X' and Y' are the vector projections in the new system and $\theta$ is one of the three rotation angles relating the systems. The invention in one of its applications, is dedicated to the solution of this form.

Figure 1:
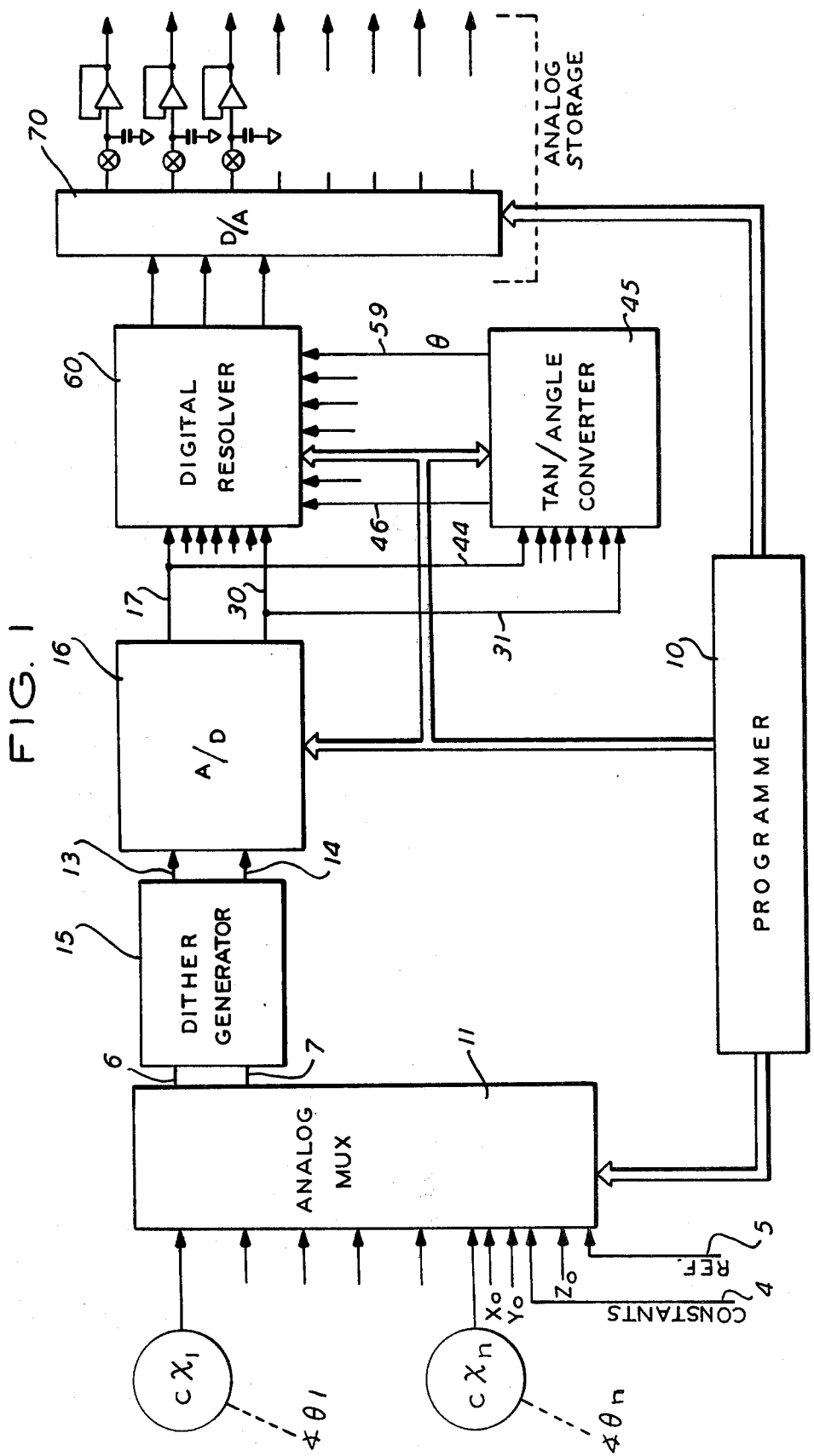
FIG. 1 is a block diagram showing the modules of a computing system for performing sequential coordinate transformations on three dimensional analog derived vectors.

Referring now to the block diagram of FIG. 1, inputs $X_0$, $Y_0$ and $Z_0$ appearing on lines 1, 2, and 3 are initial D.C. voltages proportional to the vector component magnitudes in the sensor reference system and are applied to the multiplexer module 11. Additional inputs to the multiplexer include signals derived from synchros CX1 through CXn, which define the rotation angles relating the systems, circuits constants appearing on line 4 and reference voltages appearing on line 5. Inputs to the system may be of any form which can be ultimately converted to digital binary form. The multiplexer contains conventional Scott "T" transformers, sample/hold circuits, and switching circuits required to provide selection of signals on lines 6 and 7. The signals from the multiplexer appearing on lines 6 and 7 are applied to the dither generator circuit 15. In the dither circuit a sawtooth signal is applied to the analog signals to aid in resolution of the final output signal. The dither circuit will be discussed hereinafter in greater detail with regard to FIGS. 7A through 7I. The programmer module 10 selects the signal pairs (lines 13 and 14) in the proper time sequence prescribed by the solution mathematics for computing the intended functions. The analog to digital module 16 converts the ratio of analog pairs (i.e., ratio of line 13 to line 14) to a digital ratio on lines 17 through 30 employing 13 bit two's compliment binary. The signal pairs are of two forms. Linear D.C. voltage proportional to a vector magnitude (line 13) is used to derive the digital ratio in respect to a D.C. reference voltage (line 14). Synchro data or rotation angle is of the form $\sin \theta$ (signal line 13) and $\cos \theta$ (reference line 14) to generate digital data proportional to the tangent $\theta$. The programmer module 10 steers vector digital data appearing on lines 17 through 30 to each of the three orthogonal registers 61, 62 and 63 (see FIG. 3) in the digital computing resolver module 60 and rotation data or tangent $\theta$ appearing on lines 31 through 44 to the tangent to angle converter module 45. The tangent to angle converter module 45 computes $\theta$ in digital binary form and inputs to the digital resolver on lines 46 through 59 for updating the fourth register 64 (FIG. 3) which is the rotational angle register reserved for this purpose in the digital computing resolver module 60. The conversion of tangent $\theta$ to the rotation angle $\theta$ utilizes the "Cordic" vectoring algorithm which is similar to the digital resolver rotation algorithm in a two dimensional sense thus, requiring one less register (see FIG. 4).

DIGITAL COMPUTING RESOLVER FUNCTIONAL DESCRIPTION*

*The discussion which follows is based upon the article cited above by Volder at pages 330, 331 and 332.

The trigonometric operations performed by module 60 are of the form:

$$X' = X \cos \theta \pm Y \sin \theta, \text{ and}$$

$$Y' = Y \cos \theta \mp X \sin \theta,$$

where X and Y are vector values in the initial reference systems and X' and Y' are the projections of these vectors in the reference systems rotated through an angle $\theta$ about the axis orthogonal to the plane formed by the vectors. This procedure is identified as "Rotation" or "Coordinate Transformation" and is the functional equivalent of an analog resolver.

The technique employed by the digital computing resolver is the "Cordic Algorithm," which is a step by step sequence of pseudo rotations that results in an overall rotation through the given angle. It is necessary that the angular increments forming the discrete interim rotations be computed in a decreasing order. The magnitude of the first increment chosen is 90°. Succeeding computing steps are as discussed by Volder at page 330. From FIG. 2, of the present invention the two given coordinate components $Y_i$ and $X_i$ represent this $i^{th}$ step and describe a vector of magnitude $R_i$ at an angle $\theta$, from the origin in the relationship:

$$Y_i = R_i \sin \theta$$

$$X_i = R_i \cos \theta$$

Figure 2:
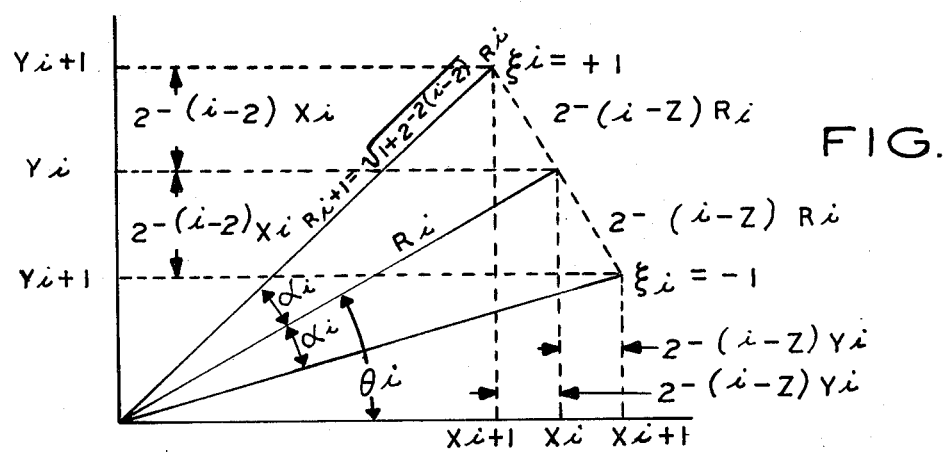
FIG. 2 is a graph of a typical computing step.

From FIG. 2 the angle $\alpha_i$ is the angle of rotation associated with each computing step and has the general expression where $i > 1$ of:

$$\alpha_i = \tan^{-1} 2^{-(i-2)}$$

Again from FIG. 2, rotating the coordinate components through $\pm \alpha_i$ may be accomplished by simply shifting and adding. The general expression for the rotated component is:

$$Y_i + 1 = \sqrt{1+2^{-2(i-2)}} \, R_i \sin(\theta \pm \alpha_i) = Y_i \pm 2^{-(i-2)} X_i^*$$

$$X_i + 1 = \sqrt{1 + 2^{-2(i-2)}} \, R_i \cos(\theta_i \pm \alpha_i) = X_i \mp 2^{-(i-2)} Y_i^*$$

*Requires a shift i-2 in the X and Y registers (simplest form of binary multiplication/division)

Note that the above two equations may be implemented by two simultaneous shift and add operations. This is the fundamental relationship upon which the digital computer resolver of this invention operates. The simultaneous shift and add operations is termed by Volder as "cross-addition" and is defined as "the computing action of adding (or subtracting) a shifted value of $X_i$ to $Y_i$ to obtain $Y_i + 1$ while simultaneously subtracting (or adding) a shifted value of $Y_i$ to $X_i$ to obtain $X_i + 1$." In order to develop the solutions for the final coordinates the reader is referred to page 331 of the Volder article cited above. The expression for the final coordinate components as taught by Volder is:

$$Y_n + 1 = [\sqrt{1+2^{-0}} \sqrt{1 + 2^{-2}} \ldots \sqrt{1 + 2^{-2(n-2)}}] R_1$$

$$\sin(\theta_1 + \xi_1 \alpha_1 + \xi_2 \alpha_2 + \ldots + \xi_n \alpha_n)$$

$$X_n + 1 = [\sqrt{1+2^{-0}} \sqrt{1 + 2^{-2}} \ldots \sqrt{1 + 2^{-2(n-2)}}] R_1$$

$$\cos(\theta_1 + \xi_1 \alpha_1 + \xi_2 \alpha_2 + \ldots + \xi_n \alpha_n)$$

For rotation of vectors or coordinate transformation assignment of +1 or −1 to $\xi_i + 1$ is made by converging the contents of the angle register 64 (FIG. 3) to zero. This is implemented by keying on the "sign" of the angle generated in the $i^{th}$ step and establishing $\xi_i + 1$ which will diminish the $i+1$ angular argument (i.e, nulling the angle register). Simultaneously with each angle nulling step control is made in the cross-addition of $Y_i$ and $X_i$ to effect a rotation of components ($Y_i + 1$ and $X_i + 1$) through an equal angular increment. At the conclusion of the computing sequence the angle register is at or near 0° and the X and Y registers, 61 and 62 respectively, contain the values of the rotated vectors.

The coordinate computing system of the invention applies the "Cordic" approach in a unique manner which approach simplifies circuitry, reduces cost and bulk and enhances reliability. Inclusion of three registers to accomodate the three orthogonal vectors permits computing without memory circuits. This is accomplished by program module 10 allowing sequential transformations on two vectors, e.g., X and Y and holding the third vector e.g., Z constant and iterating in the manner required to arrive at the ultimate solution vectors ($n$) transformation). Each transformation provides new values for two of the three vectors, which is retained by the registers until the next transformation thus, obviating the need for interim storage or memory. In essence, the invention only requires knowledge of the present vector state and angle about which it must be rotated to arrive at the new vector state. Furthermore, analog scaling or division by a constant in the digital-to-analog and storage module 70 normalizes the digital growth inherent in the algorithm thereby precluding digital division subroutines. Unequality in the three vectors which occurs during sequential transformations is accomodated by programming vector transformation through zero degrees in the interim solutions requiring additional growth to equalize with vectors which have experienced additional growth (rotation through 0° does not modify the vector state except to incorporate the intended scale factor change).

Turning now to FIG. 3, cross-addition is implemented by gating of the registers through digital multiplexers programmed to accept the vector shifted one decimal each iteration $[2^{-(i-n)} X_i]$. The shift is made from progressively increasing bits (e.g. LSB, LSB+1, LSB+2,...LSB+$i$) with each advance on $i$. Logic is included to load the shifted word with zeroes following the last register bit. This requires keying on the register's most significant bit prior to shift to determine if zero is logic 0 or logic 1 (negative number for two's compliment). The result of gating in this manner is to substantially minimize the number of register bits (as required by Volder's "Cordic" computer) and conserve program time.

The coordinate components of a vector are supplied initially from the analog-to-digital converter module 16 (i.e., initial cosine vectors) and rotation is performed through the angle generated by the tangent to angle converter module 45.

In FIG. 3 the gating diagram depicts the functional elements of the digital computing resolver module 60. Solution is accomplished by the program module 10 sequentially enabling pairs of vectors, e.g. X and Y, registers 61 and 62 respectively, for cross-addition. The procedure modifies the vector value e.g. $X_i$ in the register 61 by adding binary shifted values of the second vector e.g. $Y_i 2^{-(i-n)}$ to form the psuedo vector $X_i + 1$. The digital MUX 80 is programmed to select the register data shifted one binary digit with each advance in $i$ thus, the cross-addition term is divided by an additional factor of two with each iteration. Furthermore, the program is established to load zeroes in the most significant bits of the cross-addition terms in order that updated data shifted into the register via the feedback ($X_i + 1$) does not mix with the $X_i$ data being shifted into the MUX. This method allows for minimum register resolution. The program instruction to accomplish this end is a gating function applied to the output of the MUX enabling a shift of the register data, starting from the appropriate bit and progressing to the most significant bit (MSB) at which time the action is disabled and zeroes are applied to the cross-addition.

Figure 5:
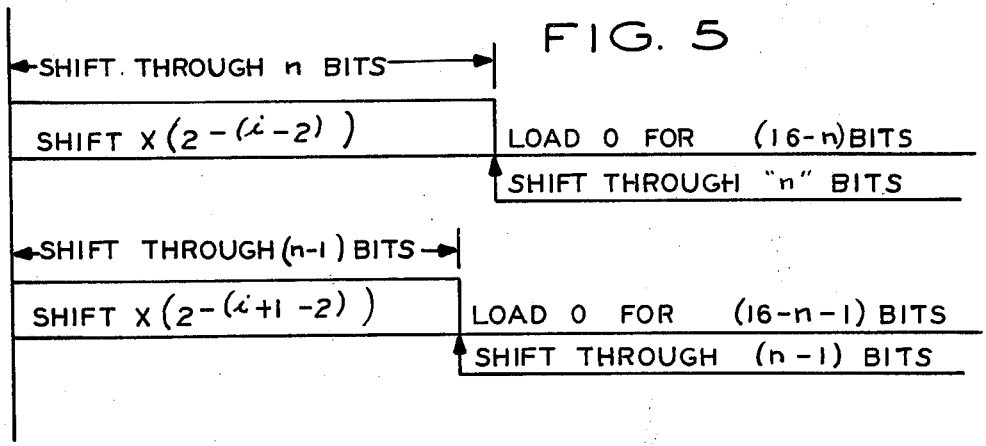
FIG. 5, is a time base chart showing the loading of the shift register on the $i^{th}$ and $i + 1$ states of the gating function in the digital computing resolver.

FIG. 5 depicts the $i^{th}$ and $i+1$ states of this gating function. The coordinate components of a vector are supplied initially from analog-to-digital converter module 16 (i.e., initial cosine vector) and rotation is performed through the angle generated by the tangent to angle converter module 45.

Referring now to FIG. 4, the tangent to angle converter module 45 utilizes the Cordic method of vectoring to produce digital angle formed by its inputs (i.e., unity at Y register 100 and tan angle. . .at X register 101. . .the vector magnitudes of two sides of a right triangle containing solution angle $\theta$). Implementation is nearly identical to the digital resolver module 60 based on two axes, X and Y. Vectoring is identical to rotation except that angle register 100 is initialized at zero and the Y register 101 is nulled. ultimately angle register 100 contains the angle formed by the initial X and Y vectors.

Upon the completion of the proper sequence of coordinate transformations in the digital resolver, the resulting orthogonal vectors (X, Y and Z) are converted to analog form and stored in a dedicated digital to analog converter module 70 (i.e., hold circuits) for outputting. Each output is updated at the established throughput rate which may be as rapid as 2.5 milliseconds utilizing 400 Hz synchros.

Figure 6:
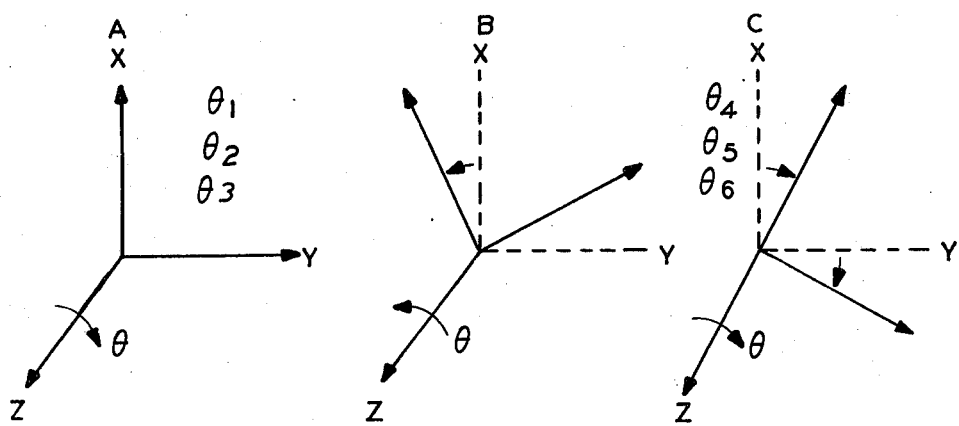
FIG. 6 is a graph showing six rotations of the orthogonal pointing vector.

As seen in FIG. 6 the invention is not restricted to three rotations and in fact will achieve the best cost advantage because of its multiplexing arrangements where rotations to interim systems are required to condition the vector solution to its final form. As an application, sensor data defining the pointing vector in respect to the vehicle's local vertical system A must first be stabilized in roll, pitch and yaw to identify the vector in terms of geocentric coordinates (e.g. system B) and then rotated through three additional angles to arrive at a vector definition in the celestial north pointing field (e.g. system C). In this case, six angles as sensed by six synchros are required as inputs, in addition to the three vector magnitude signals sensed in system A.

Turning to FIGS. 7A through 7I a dither generator and insertion circuits are used to enhance the resolutions of the system. The actual resolution is limited by the number of digital bits produced in the analog to digital converter, the length of the shift register and the number of bits accepted by the digital to analog converter. For example, in the analog to digital converter angular inputs are processed as shown in Table I.

TABLE 1

| INPUT ANGLE | OUTPUT ANGLE |
|---|---|
| 45.10° | 45.10° |
| 45.09° | 45.10° |
| 45.08° | 45.10° |
| 45.07° | 45.10° |
| 45.06° | 45.10° |
| 45.05° | 45.10° |
| 45.04° | 45.00° |
| 45.03° | 45.00° |
| 45.02° | 45.00° |
| 45.01° | 45.01° |
| 45.00° | 45.00° |
| 44.99° | 45.00° |
| 44.98° | 45.00° |
| 44.97° | 45.00° |
| 44.96° | 45.00° |
| 44.95° | 44.90° |
| 44.93° | 44.90° |
| 44.92° | 44.90° |

TABLE 1-continued

| INPUT ANGLE | OUTPUT ANGLE |
|---|---|
| 44.91° | 44.90° |
| 44.90° | 44.90° |

Figure 7A:
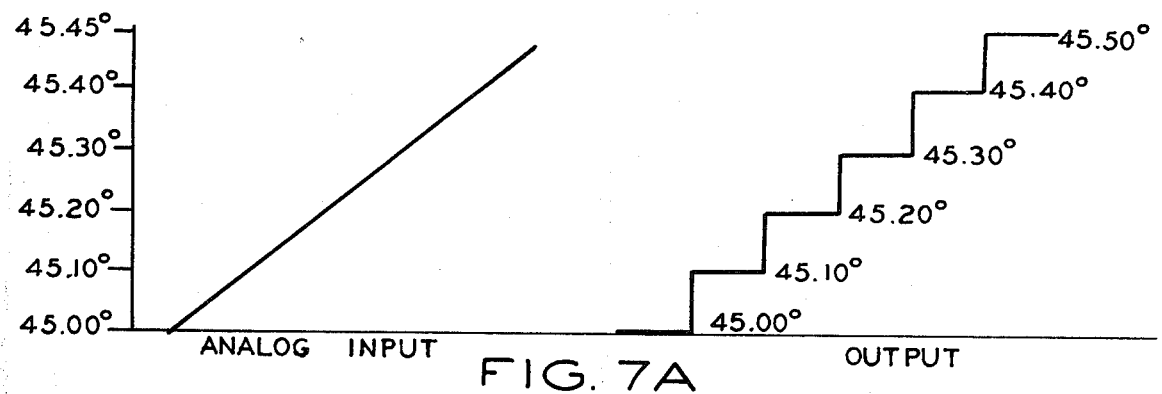
Figure 7B:
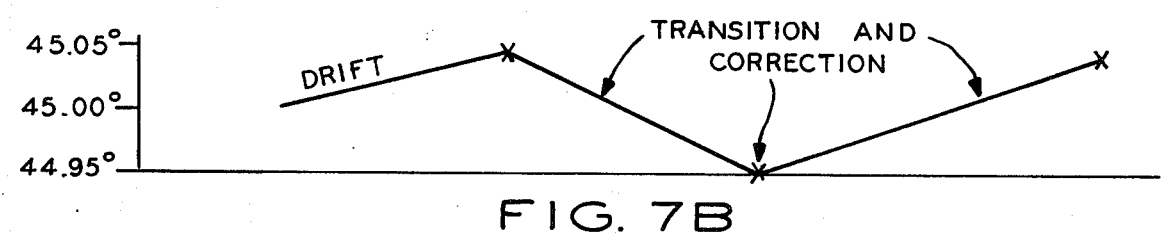

From Table I it is seen that any input angle in the range from 44.96° to 45.04° will provide an output angle of 45.00° because of the limited digital resolution of the system, then at input angle 45.05° an abrupt change to an output angle of 45.10° occurs. As a result a gradually changing input angle would produce the output plot as shown in FIG. 7A. In some angular computing systems the output plot shown in FIG. 7A might be acceptable and in other systems it would be objectionable. In particular, in a closed loop system which is attempting to find a null, any drift in the output would not be detected until one of the abrupt digital transactions occurs and the servo may hunt back and forth 1 LSB as shown in FIG. 7B. This hunting could cause excessive power consumption and wear of servo gears.

In practice, the number of digital bits processed in the anglog to digital and digital to analog converters and the shift registers are limited both by cost and speed of operation. The dither generator makes the system appear to have more digital resolution without affecting the speed and will have a small impact on cost. The dither generator operates by adding a very small (1 bit) angular oscillation whose average value is zero and whose frequency is much higher than the drift rate discussed above.

Figure 7C:
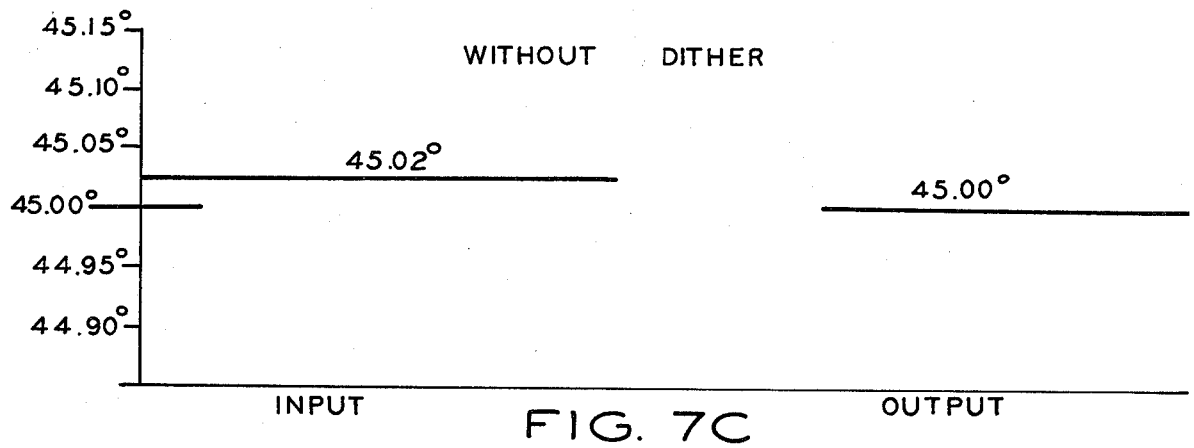
Figure 7D:
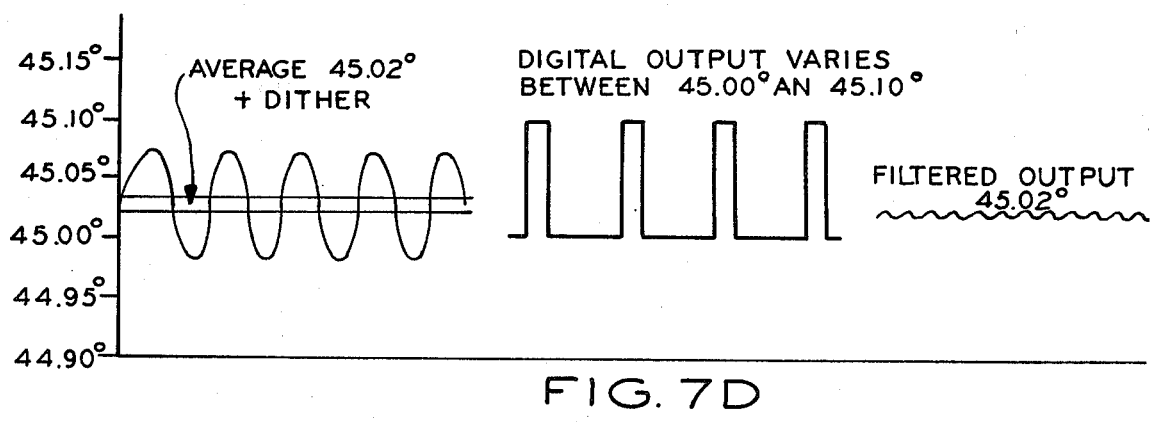

In FIGS. 7C and 7D there are plots of the output signal level without a dither signal (FIG. 7C) and the output with a dither signal (FIG. 7D). The digital output varies between 45.00° and 45.10°, in this case more at 45.00° than at 45.10° such that the value averages to 45.02° when filtered. As the analog input approaches 45.05° the digital output is at 45.00° 50 percent of the time and the average becomes 45.05°. At exactly 45.00° the amplitude is less than 1 LSB, the output is always 45.00° and thus the average is also 45.00°.

In the drift situations described above, with the filtered analog output now at intermediate values between 44.95° and 45.05° the correction is much sooner and more accurate and the hunting will not occur. From FIG. 7E, the new system is seen to have much greater resolution.

As seen in FIG. 7F, the analog signals appearing on lines 6 and 7 from the multiplexer 11 are applied to analog switches 91 of the dither generator circuit. Also applied to analog switches 91 is the sawtooth signal shown in FIG. 7G. This signal is generated in programmer 90 and is applied to switches 91 in the time sequence depicted (i.e., at a 50 cycle rate). The output appearing on line 13 from comparator amplifier 93 is the reference voltage, $C\theta'$ and the output appearing on line 14 of comparator amplifier 94 is the signal, $S\theta'$. These signals are then applied to the analog to digital converter 16 for further processing as discussed above with regard to FIG. 1.

FIGS. 7H and 7I are the mechanical equivalent and mathematics respectively of the electrical circuit of FIG. 7F. In other words, by oscillating the shaft of the resolver through an angle $\Delta\theta$ we arrive at the equation shown in FIG. 7I. This is the functional equivalent of adding a sawtooth signal to the analog signals derived from multiplexer 11.

Thus, it has been shown that the inherent truncation errors associated with digital processing are greatly reduced by programming low amplitude dither (or oscillation) on each analog input by means of the circuit of FIG. 7F. In the absence of the dither generator the system would not respond to input changes less than the amplitude of the least significant bit. The peak to peak amplitude of the oscillation is slightly greater than 1 LSB and the average value is zero in order not to introduce error. The dither generator produces two 12 bit output solutions separated by the 12th bit in magnitude and having an average value proportional to inputs changes less than the 12th bit. Theoretically a 4 bit dither generator will enchance system resolution by a factor of 16 (i.e., capable of detecting output changes due to input changes one sixteenth of the output register). Solution effectiveness is contingent upon adequate output filtering.

A sawtooth generator was chosen for ease of implementation (any repetitive function with zero average value serves equally well). The dither signal is applied to each input as it is addressed by the programmer through the multiplexer, thus enabling cost minimization by time sharing. Implementation is similar to the effect produced by processing all analog signals by a resolver whose shaft is oscillated through a small angle.

The analog multiplexer module 11 incorporates circuitry which provides scale factor switching as a function of the weight of the total pointing vector. Range switching is mechanized by increasing the signal gain of the analog to digital converter module 16 in discrete steps as the solution vector diminishes. Thus, outputting scale integrity is maintained and solution sensitivity increased.

From the foregoing, a system requiring minimum storage capability for performing digital sequential coordinate transformation on $n$ dimensional vector analog input data and ultimate vector analog outputting of the n dimensional data in a form compatable with analog equipment has been disclosed.

While there has been described what at present are believed to be the preferred embodiments of this invention, it will be obvious to those skilled in the art that various modifications can be made therein within the scope of the invention.

What is claimed is:

1. Apparatus for performing digital coordinate transformation on $n$ dimensional analog input data and ultimate outputting of the $n$ dimensional data in a form compatible with analog utilization equipment comprising:
    a source of input vector and rotation angle data, and
    means for performing coordinate transformation on pairs of said input vector data through a given rotation angle while holding other of said input vector data constant and iterating in a like manner to perform coordinate transformation on different pairs of said input vector data.

2. The apparatus of claim 1 comprising:
    a separate means in said coordinate transformation means for temporarily storing the coordinate transformation data of each vector and rotation angle.

3. The apparatus of claim 2 comprising:
    means for the cross-addition of the outputs of pairs said temporary storage means.

4. The apparatus of claim 3 comprising:
    means for gating said temporary storage means to load binary zeroes after said data has been shifted.

5. The apparatus of claim 4 comprising:
    means for controlling the processing of said input data through said apparatus.

6. Apparatus for performing coordinate transformations on $n$ dimensional analog input data comprising:
    a source of input vector and rotation angle data,
    means for performing digital coordinate transformation on pairs of said input vector data through a given rotation angle while holding other of said vector data constant and iterating in a like manner to perform coordinate transformation on different pairs of said input vector data,
    means for the digital cross addition of the results of transformation of said chosen pair of vector inputs,
    means for outputting the final coordinate transformation of said input vector and rotation angle, and
    means for controlling the processing of said input data through said apparatus.

7. The apparatus according to claim 6 comprising:
    three sets of shift registers in said digital coordinate transformation means, each of said registers being dedicated to the computation of one of three orthogonal vectors and a fourth register being dedicated to provide rotation angle, whereby said control means may control digital conditions to said digital coordinate transformations means and select two of said three vector registers for cross-addition and said control means subsequently selects a different pair of vector registers to produce the coordinate transformation of said different set of registers.

8. The apparatus of claim 7 comprising:
    means for obtaining rotation angle comprising three sets of shift registers, two of which operate on digital tangent angle data to compute by cross addition rotation angle in the third register.

9. The apparatus of claim 8 comprising:
    means for gating said vector registers to accept the vector shifted one decimal each iteration $2^{-(i-n)}X_i$ by starting the shift of said registers from progressively increasing bits (LSB, LSB + 1, LSB + 2,...LSB + $i$) with each advance on $i$ and means to load the shifted word with zeroes following the shift of the most significant register bit, by keying on the register's most significant bit prior to shift to determine if zero is logic 0 or logic 1, whereby the number of register bits is substantially minimized and program time is conserved.

10. The apparatus of claim 9 comprising:
    means for scale factor switching as a function of the weight of the total pointing vector and for range switching by increasing the signal gain of said means in discrete steps as the solution vector diminishes whereby the output scale integrity is maintained and solution sensitivity increased.

11. The apparatus according to claim 10 comprising:
    means for superposing a sawtooth signal upon said input vector and rotation angle data whereby truncation errors are eliminated.

12. A solid state system for performing digital coordinate transformation on three dimensional analog input data and ultimate analog outputting of the three dimensional data comprising:
    a multiplexer module for sampling at a predetermined rate a plurality of analog vector and angle data inputs,
    an analog-to-digital module operative upon signals from said multiplexer for encoding said analog signals and deriving binary data for subsequent digital computation, a tangent to angle converter module operative upon digital tangent $\theta$ from aid analog-to-digital converter for computing rotation angle $\theta$, a digital computing resolver module operative upon signals from said analog-to-digital module and said tangent to angle converter for performing coordinate transformation on said signals from said analog-to-digital converter module and said tangent to angle converter, said digital computing resolver module comprising four shift registers, three of which are dedicated to the computation of three orthogonal vectors with the fourth register dedicated to the nulling of the rotation angle, said digital computing resolver module performing cross-addition on two of said orthogonal shift registers while holding the third of said orthogonal shift registers constant to produce coordinate transformation iterating in a like manner to arrive at the ultimate coordinate solution thereby eliminating storage means and intermediate registers, a digital-to-analog module for decoding signals from said digital computing resolver module and for compensating for growth factor of said signals during said computation, and a programmer module operable on the component modules of said apparatus for processing said signals through said apparatus on a programmed basis.

13. A digital computer resolver comprising:

three sets of shift registers, each of said registers being dedicated to the computation of one of three orthogonal vectors, and a fourth register being dedicated to provide rotation angle, said resolver selecting two of said three vector registers and said rotation angle register for cross-addition to produce coordinate transformation of a source of input vector and rotation data while holding the third vector register constant and thereafter selecting a different set of two vector registers and said rotation angle register for performing coordinate transformation on said different set of vector registers.

14. The apparatus of claim 13 comprising:

means for gating said vector registers to accept the vector shifted one decimal each iteration $[2^{-(i-n)}X_i]$ by starting the shift of said registers from progressively increasing bits (LSB, LSB+1, LSB+2,...LSB+i) with each advance on $i$, and means to load the shifted word with zeroes following the shift of the most significant register bit, by keying on the register's most significant bit prior to shift to determine if zero is logic 0 or logic 1, whereby the number of register bits is substantially minimized and program time is conserved.

15. A tangent to angle converter comprising:

three sets of shift registers, two of said registers dedicated to operate on tangent angles from an analog to digital converter and to compute angle $\theta$ in the third register by cross adding of tangent data in said registers dedicated to operate on tangent angles, means for gating said tangent registers to accept the tangent data shifted one decimal each iteration $[2^{-(i-n)}X_i]$ by starting the shift of said registers from progressively increasing bits (LSB, LSB+1, LSB+2,...LSB+i) with each advance on $i$, and means to load the shifted word with zeros following the shift of the most significant register bit, by keying on the registers most significant bit prior to shift to determine if zero is logic 0 or logic 1, whereby the number of register bits is substantially minimized and program time is conserved.

16. The method of performing coordinate transformation on $n$ dimensional input vector and rotation angle data comprising:

sequentially sampling a source of input vector and rotation angle data, computing coordinate transformation by cross-adding selected pairs of said input vectors about a given rotation angle, iterating in a like manner to perform coordinate transformation on different pairs of said input vector data to obtain ultimately the terminal vector solution by rotating the interim vector solutions sequentially through the input angles, and storing the solutions.

17. The method of claim 16 including superposing a sawtooth signal upon said input vector and rotation angle data, thereby eliminating truncation errors.

* * * * *